United States Patent
Ishida et al.

(10) Patent No.: US 9,663,371 B2
(45) Date of Patent: May 30, 2017

(54) POLYCRYSTALLINE DIAMOND BODY, CUTTING TOOL, WEAR-RESISTANT TOOL, GRINDING TOOL, AND METHOD FOR PRODUCING POLYCRYSTALLINE DIAMOND BODY

(71) Applicant: Sumitomo Electric Industries, Ltd., Osaka-shi (JP)

(72) Inventors: Yuh Ishida, Itami (JP); Katsuko Yamamoto, Itami (JP); Hitoshi Sumiya, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 119 days.

(21) Appl. No.: 14/706,318

(22) Filed: May 7, 2015

(65) Prior Publication Data

US 2015/0321317 A1 Nov. 12, 2015

(30) Foreign Application Priority Data

May 8, 2014 (JP) .................................. 2014-096747

(51) Int. Cl.
*C09K 3/14* (2006.01)
*C01B 31/06* (2006.01)
*B24D 3/00* (2006.01)
*B24D 18/00* (2006.01)
*C04B 35/52* (2006.01)
*C04B 35/645* (2006.01)

(52) U.S. Cl.
CPC .............. *C01B 31/06* (2013.01); *B24D 3/008* (2013.01); *B24D 18/0009* (2013.01); *C04B 35/52* (2013.01); *C04B 35/645* (2013.01); *C04B 2235/425* (2013.01); *C04B 2235/427* (2013.01); *C04B 2235/5445* (2013.01); *C04B 2235/656* (2013.01); *C04B 2235/76* (2013.01); *C04B 2235/785* (2013.01); *C04B 2235/96* (2013.01)

(58) Field of Classification Search
CPC .............. B24D 3/00; B24D 3/18; C09K 3/14
See application file for complete search history.

(56) References Cited

U.S. PATENT DOCUMENTS 4,923,490 A * 5/1990 Johnson .................... B24D 3/06
51/295
5,011,514 A * 4/1991 Cho ......................... B01J 3/062
51/293

FOREIGN PATENT DOCUMENTS

JP 04-074766 A 3/1992
JP 04-114966 A 4/1992

OTHER PUBLICATIONS

Bundy, "Direct Conversion of Graphite to Diamond in Static Pressure Apparatus," J. Chem. Phys. vol. 38, pp. 631-643 (1963).

(Continued)

*Primary Examiner* — Pegah Parvini
(74) *Attorney, Agent, or Firm* — Venable LLP; Michael A. Sartori; F. Brock Riggs

(57) ABSTRACT

A polycrystalline diamond body contains diamond particles. The diamond particles have a mean particle size of 50 nm or less. As a result of measurement of a knoop hardness under a test load of 4.9 N at 23° C.±5° C., the polycrystalline diamond body has a ratio of a length B of a shorter diagonal line with respect to a length A of a longer diagonal line of diagonal lines of a knoop indentation, expressed as a B/A ratio, of 0.080 or less. This polycrystalline diamond body is tough and has a small particle size.

6 Claims, 1 Drawing Sheet

(56) References Cited

OTHER PUBLICATIONS

Wakatsuki et al., "Notes on Compressible Gasket and Bridgman-Anvil Type High Pressure Apparatus," Japan. J. Appl. Phys., vol. 11, No. 4, pp. 578-590 (1972).

Naka et al., "Direct Conversion of Graphite to Diamond under Static Pressure," Nature, vol. 259, pp. 38-39, Jan. 1 & 8, 1976.

Irifune et al., "Nature of Polycrystalline Diamond Synthesized by Direct Conversion of Graphite Using Kawai-Type Multianvil Apparatus," New Diamond and Frontier Carbon Technology, vol. 14, No. 5, pp. 313-327 (2004).

Sumiya et al., "Synthesis of High-Purity Nano-Polycrystalline Diamond and Its Characterization," SEI Technical Review, vol. 165, pp. 68-74, Sep. 2004.

* cited by examiner

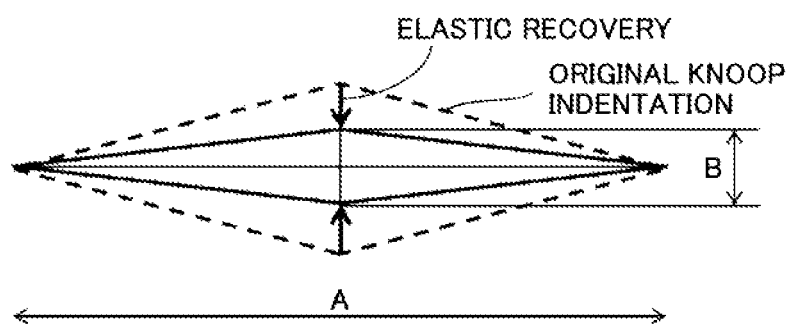

POLYCRYSTALLINE DIAMOND BODY, CUTTING TOOL, WEAR-RESISTANT TOOL, GRINDING TOOL, AND METHOD FOR PRODUCING POLYCRYSTALLINE DIAMOND BODY

BACKGROUND OF THE INVENTION

Field of the Invention

The present invention relates to a polycrystalline diamond body, a cutting tool, a wear-resistant tool, a grinding tool, and a method for producing a polycrystalline diamond body. More particularly, the invention relates to a polycrystalline diamond body useful as a cutting tool, a wear-resistant tool, and a grinding tool, the cutting tool, the wear-resistant tool, and the grinding tool as well as a method for producing the polycrystalline diamond body.

Description of the Background Art

A sintered diamond body used for conventional diamond tools is obtained using a metal such as cobalt (Co) or the like, and a ceramic such as silicon carbide (SiC) or the like, as a sintering aid and a binder. Further, Japanese Patent Laying-Open No. 4-074766 and Japanese Patent Laying-Open No. 4-114966, for example, disclose using carbonates as sintering aids. According to these documents, a sintered diamond body is obtained by sintering diamond powder along with a sintering aid and a binder under stable high-pressure and high-temperature conditions in which diamond is thermodynamically stable (generally, pressure 5 to 8 GPa, temperature 1300-2200° C.). On the other hand, naturally occurring polycrystalline diamond bodies (carbonado and ballas) are also known, and some of them are used as drill bits. These polycrystalline diamond bodies, however, are not used for industrial purposes very often, since they vary significantly in material quality, and can only be found in limited quantities.

A polycrystalline diamond body obtained using a sintering aid contains the sintering aid used, which may act as a catalyst promoting graphitization of diamond. As a result, the heat resistance of the resulting polycrystalline diamond body deteriorates. Further, when heat is applied to the polycrystalline diamond body, fine cracks tend to develop due to a difference in thermal expansion between the catalyst and the diamond. As a result, the mechanical properties of the polycrystalline diamond body deteriorate.

Polycrystalline diamond bodies are also known from which the metal present at grain boundaries of diamond particles has been removed to improve the heat resistance. Although this method improves the heat-resistant temperature to about 1200° C., the polycrystalline body becomes porous and thus, has further decreased strength. A polycrystalline diamond body obtained using SiC as a binder has high heat resistance, however, it has low strength because diamond particles are not bonded together.

On the other hand, a method is known in which non-diamond carbon such as graphite, amorphous carbon, or the like is directly converted into diamond at an ultra-high pressure and a high pressure, without using a catalyst and/or a solvent, and sintered simultaneously (direct conversion and sintering method). J. Chem. Phys., 38 (1963) pp 631-643, Japan. J. Appl. Phys., 11 (1972) pp. 578-590, and Nature 259 (1976) p. 38, for example, have shown that a polycrystalline diamond body is obtained using graphite as a starting material under an ultra-high pressure of 14 to 18 GPa and a high temperature of 3000 K and more.

However, in the production of a polycrystalline diamond body according to all of J. Chem Phys., 38 (1963) pp. 631-643, Japan J. Appl. Phys., 11 (1972) pp. 578-590, and Nature 259 (1976) p. 38, a method of heating by direct current passage is used in which conductive non-diamond carbon such as graphite or the like is heated by directly passing current therethrough. The polycrystalline diamond body thus obtained contains remaining non-diamond carbon such as graphite or the like, and also has a nonuniform crystal grain size of diamond. As a result, the polycrystalline diamond body has poor hardness and strength.

Thus, in order to improve the hardness and strength, New Diamond and Frontier Carbon Technology, 14 (2004) p. 313 and SEI Technical Review 165 (2004) p. 68 have shown a method for obtaining a dense and high-purity polycrystalline diamond body by a direct conversion and sintering method, in which high-purity graphite as a raw material is indirectly heated at an ultra-high pressure of 12 GPa or more and a high temperature of 2200° C. or more.

SUMMARY OF THE INVENTION

In the production of a polycrystalline diamond body according to New Diamond and Frontier Carbon Technology, 14 (2004) p. 313 and SEI Technical Review 165 (2004) p. 68, the sintering temperature is reduced, in order to obtain a polycrystalline diamond body having a small particle size for use in ultra-precision machining, for example. As a result, the polycrystalline body cannot be sintered sufficiently, and has decreased strength. Moreover, when the particle size of diamond particles is small, toughness decreases, which makes the tool easily chipped.

Accordingly, it is an object of the invention to solve the aforementioned problems, and provide a polycrystalline diamond body that is tough and has a small particle size, a cutting tool, a wear-resistant tool, a grinding tool, and a method for producing the polycrystalline diamond body.

A polycrystalline diamond body according to an aspect of the invention contains diamond particles. The diamond particles have a mean particle size of 50 nm or less. As a result of measurement of a knoop hardness under a test load of 4.9 N at 23° C.±5° C., the polycrystalline diamond body has a ratio of a length B of a shorter diagonal line with respect to a length A of a longer diagonal line of diagonal lines of a knoop indentation, expressed as a ratio B/A, of 0.080 or less.

A method for producing a polycrystalline diamond body according to another aspect of the invention includes the steps of preparing non-diamond carbon powder having a particle size of 0.5 μm or less as a starting material, and converting the non-diamond carbon powder into diamond particles and sintering the diamond particles at a temperature and a pressure satisfying the following conditions: when P denotes pressure (GPa) and T denotes temperature (° C.), $P \geq 0.0000168T^2 - 0.0867T + 124$; $T \leq 2300$; and $P \leq 25$.

In accordance with the foregoing, a polycrystalline diamond body that is tough and has a small particle size, a cutting tool, a wear-resistant tool, a grinding tool, and a method for producing the polycrystalline diamond body are provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram for illustrating a knoop indentation.

DESCRIPTION OF THE PREFERRED EMBODIMENTS

Description of Embodiments of the Invention

The present inventors conducted extensive research to solve the aforementioned problems, and found that when non-diamond carbon powder such as graphite or the like having a particle size of 0.5 μm or less is directly converted into diamond particles at a high pressure and a high temperature, a polycrystalline diamond body that is tough and has a fine structure can be obtained.

[1] A polycrystalline diamond body according to an aspect of the invention contains diamond particles, the diamond particles having a mean particle size of 50 nm or less, and as a result of measurement of a knoop hardness under a test load of 4.9 N at 23° C.±5° C., the polycrystalline diamond body having a ratio of a length B of a shorter diagonal line with respect to a length A of a longer diagonal line of diagonal lines of a knoop indentation, expressed as a B/A ratio, of 0.080 or less. This polycrystalline diamond body is tough and has a fine particle size of the diamond particles forming the polycrystalline diamond body.

[2] The diamond particles preferably have a mean particle size of 30 nm or less. The further reduced mean particle size makes the polycrystalline diamond body more suitable for use in applications that require a small particle size.

[3] The diamond particles preferably have a ratio of an X-ray diffraction intensity $I_{(220)}$ in a (220) plane with respect to an X-ray diffraction intensity $I_{(111)}$ in a (111) plane according to X-ray diffraction, expressed as a ratio $I_{(220)}/I_{(111)}$, of not less than 0.1 and not more than 0.3. This makes the polycrystalline body isotropic, so that when the polycrystalline body is used as a tool or the like, partial wear can be reduced.

[4] A cutting tool according to another aspect of the invention includes the above-described polycrystalline diamond body. Thus cutting tool is useful for cutting various materials.

[5] A wear-resistant tool according to yet another aspect of the invention includes the above-described polycrystalline diamond body. This wear-resistant tool is useful for machining various materials.

[6] A grinding tool according to yet another aspect of the invention includes the above-described polycrystalline diamond body. This grinding tool is useful for grinding various materials.

[7] A method for producing a polycrystalline diamond body according to yet another aspect of the invention includes the steps of preparing non-diamond carbon powder having a particle size of 0.5 μm or less as a starting material, and converting the non-diamond carbon powder into diamond particles and sintering the diamond particles at a temperature and a pressure satisfying the following conditions: when P denotes pressure (GPa) and T denotes temperature (° C.), $P \geq 0.0000168T^2 - 0.0867T + .124$; $T \leq 2300$; and $P \leq 25$. The polycrystalline diamond body obtained by this method is tough and has a fine particle size of the diamond particles forming the polycrystalline diamond body.

Details of Embodiment of the Invention

An embodiment of the invention (hereinafter referred to as "this embodiment") will be hereinafter described in further detail.

<Polycrystalline Diamond Body>

A polycrystalline diamond body according to this embodiment of the invention contains diamond particles. The diamond particles have a mean particle size of 50 nm or less. As a result of measurement of a knoop hardness under a test load of 4.9 N at 23° C.±5° C., the polycrystalline diamond body has a ratio of a length B of a shorter diagonal line with respect to a length A of a longer diagonal line of diagonal lines of a knoop indentation, expressed as a B/A ratio, of 0.080 or less.

As described above, the polycrystalline diamond body according to this embodiment contains diamond particles. As long as the polycrystalline diamond body contains diamond particles, it may also contain inevitable impurities in an amount such that the effect of this embodiment is attained. Examples of inevitable impurities may include nitrogen (N), hydrogen (H), oxygen (O), and the like. The polycrystalline body is substantially free of a binder, a sintering agent, a catalyst, and the like. This is one of advantages of the polycrystalline diamond body of this embodiment, because this overcomes the disadvantages of containing a binder, a sintering agent, and/or a catalyst, as in conventional sintered diamond bodies.

It is noted that although the polycrystalline diamond body is a sintered body, since the term "sintered body" generally intends to include a binder, the term "polycrystalline body" is used in this embodiment.

<Diamond Particles>

The diamond particles contained in the polycrystalline diamond body of this embodiment have a small particle size, and specifically, the diamond particles have a mean particle size of 50 nm or less, and preferably a mean particle size of 30 nm or less. Since a smaller mean particle size is preferable, it is not necessary to define the lower limit thereof. From a production standpoint, however, the lower limit of the mean particle size is 10 nm.

The particle size of the diamond particles is preferably uniform, in order to eliminate stress concentration and provide high strength. The particle size distribution is preferably a normal distribution. The mean particle size is preferably a mean of the normal distribution. The "particle size of the diamond particles" as simply referred to herein represents the particle size of crystal grains of the diamond particles forming the polycrystalline diamond body.

The above-described mean particle size can be determined by an intercept method using a scanning electron microscope. Specifically, the polycrystalline diamond body is first observed with a scanning electron microscope (SEM) at 1000 to 100000 times magnification to obtain an SEM image.

A circle is then drawn on the SEM image, and eight straight lines are drawn radially from the center of the circle to the perimeter of the circle (such that the intersection angle between adjacent straight lines is substantially equal). In this case, the observation magnification and the diameter of the circle described above are preferably set such that the number of diamond particles (crystal grains) per straight line is about 10 to 50.

Next, for each straight line, the number of times that the straight line crosses grain boundaries of the diamond particles is counted, an average intercept length is determined by dividing the length of the straight line by the number of times of crossing, and the average intercept length is multiplied by 1.128 to give the mean particle size. It is noted that in order to obtain the mean particle size, it is preferred to use a plurality of SEM images, determine the mean panicle size for each image in the manner as described above, and give a mean value of these mean particle sizes as the mean particle size.

Since the diamond particles contained in the polycrystalline diamond body of this embodiment have such a small particle size, the polycrystalline diamond body can be used in a wide range of applications when it is used as a tool or the like, such as high-load applications, micromachining applications, and the like.

<Knoop Hardness>

As a result of measurement of a knoop hardness under a test load of 4.9 N at 23° C.±5° C., the polycrystalline diamond body of this embodiment has a ratio of the length B of the shorter diagonal line with respect to the length A of the longer diagonal line of the diagonal lines of a knoop indentation, expressed as a B/A ratio, of 0.080 or less.

The measurement of a knoop hardness is known as one measure of indicating the hardness of an industrial material as defined in JIS Z2251:2009, for example. The hardness of the material to be measured is determined by pressing a knoop indenter against the material under a predetermined load (test load) at a predetermined temperature.

As used herein, the knoop indenter is an indenter made of diamond whose bottom is in the form of a rhombus-shaped quadratic prism. The rhombus of the bottom is defined such that the ratio of the length B of the shorter diagonal line with respect to the length A of the longer diagonal line of the diagonal lines, expressed as the B/A ratio, is 0.141. The knoop indentation refers to an indentation that remains on a place from which the knoop indenter is released immediately after it has been pressed against the material to be measured (in this embodiment, the polycrystalline diamond body) under the test load at the temperature described above.

One feature of the polycrystalline diamond body of this embodiment is that the B/A ratio of knoop indentation described above (0.080 or less) is lower than the original B/A ratio of the knoop indentation (0.141). This is because the material to be measured (that is, the polycrystalline diamond body in this embodiment) behaves elastically, and undergoes recovery such that the indentation tries to elastically return to its original state (elastic recovery).

This phenomenon will now be specifically described with FIG. 1, which conceptually illustrates the knoop indentation. For example, when the material to be measured shows no elastic recovery, the cross section of the knoop indenter and the knoop indentation have an equal shape (see the portion indicated as the "original knoop indentation" in FIG. 1). However, because elastic recovery tends to occur in the direction of the arrow head shown in FIG. 1, the knoop indentation in this embodiment has the rhombus shape shown by the solid line in FIG. 1. That is, when the return in the direction of the arrow head in FIG. 1 increases, the value of the B/A ratio decreases, and a lower value of the B/A ratio indicates higher elastic recovery (elastic property).

The polycrystalline diamond body of this embodiment has a high elastic recovery force, as is clear from its B/A ratio of knoop indentation as described above. The higher the elastic recovery is, the higher the toughness is, which means that the polycrystalline diamond body is tough. As described above, the B/A ratio of knoop indentation in this embodiment is an index of the degree of elastic recovery of the polycrystalline diamond body.

It is noted that a smaller B/A ratio of knoop indentation may be preferable since this increases elastic recovery. It is thus not particularly necessary to define the lower limit of the B/A ratio. If, however, elastic recovery becomes excessively high, the elastic property will become high. That is, when the polycrystalline diamond body is used as a tool, it is subject to a large elastic deformation, leading to lowered machinability. From this standpoint, the lower limit of the B/A ratio of knoop indentation is preferably 0.040. More preferably, the B/A ratio of knoop indentation is 0.050 to 0.080.

<X-Ray Diffraction>

The diamond particles contained in the polycrystalline diamond body of this embodiment preferably have a ratio of an X-ray diffraction intensity $I_{(220)}$ in a (220) plane with respect to an X-ray diffraction intensity $I_{(111)}$ in a (111) plane according to X-ray diffraction, expressed as a ratio $I_{(220)}/I_{(111)}$, of not less than 0.1 and not more than 0.3. This makes the polycrystalline body isotropic, so that when the polycrystalline body is used as a tool or the like, partial wear can be reduced.

If the ratio $I_{(220)}/I_{(111)}$ is outside the above-defined range, the polycrystalline body will be oriented and anisotropic. In this case, the polycrystalline body will show a distribution of strength, and include surfaces that vary in strength. This makes the polycrystalline body unsuitable for use as a tool. If the polycrystalline body is used particularly as a rotary tool such as an end mill or the like, it will both have a surface resistant to wear or chipping and a surface not resistant to wear or chipping, and is subject to partial wear. In order to avoid this drawback, the polycrystalline body is preferably isotropic.

<Applications>

The polycrystalline diamond body of this embodiment is tough and has a fine particle size of diamond particles (crystal grains), and therefore, is suitable for use as a cutting tool, a wear-resistant tool, a grinding tool, and the like. That is, each of the cutting tool, the wear-resistant tool, and the grinding tool of this embodiment includes the above-described polycrystalline diamond body.

It is noted that each of these tools may be completely formed of the polycrystalline diamond body, or may be only partially (in the case of a cutting tool, for example, the cutting edge portion) formed of the polycrystalline diamond body. Alternatively, each tool may have a coating film formed on the surface.

Examples of the cutting tool may include a drill, an end mill, an insert for drilling, an insert for end milling, an insert for milling, an insert for lathe turning, a metal saw, a gear cutting tool, a reamer, a tap, a cutting bit, and the like.

Examples of the wear-resistant tool may include a die, a scriber, a scribing wheel, a dresser, and the like.

Examples of the grinding tool may include a grinding wheel and the like.

<Production Method>

A method for producing a polycrystalline diamond body according to this embodiment includes the steps of preparing non-diamond carbon powder having a particle size of 0.5 μm or less as a starting material (hereinafter also referred to as the "preparation step"), and converting the non-diamond carbon powder into diamond particles and sintering the diamond particles at a temperature and a pressure satisfying the following conditions: when P denotes pressure (GPa) and T denotes temperature (° C.), $P \geq 0.0000168T^2 - 0.0867T + 124$; $T \leq 2300$; and $P \leq 25$ (hereinafter also referred to as the "sintering step")

The above-described method allows the polycrystalline diamond body described above to be produced. That is, the polycrystalline diamond body obtained by this method is tough and has a fine particle size (a mean particle size of 150 nm or less) of the diamond particles forming the polycrystalline diamond body.

In the preparation step, the non-diamond carbon powder used as the starting material is not particularly limited as long as it is carbon other than diamond, and may be graphite, amorphous carbon, or the like.

The particle size of the non-diamond carbon powder is preferably slightly greater than the mean particle size of the diamond particles of the polycrystalline diamond body to be obtained. This is because, due to recombination through the rearrangement of atoms during conversion of the non-diamond carbon powder into diamond, the particle size of the diamond will become smaller than the particle size of the raw material. It is noted here that if the particle size of the raw material is small, the number of grain boundaries where the original non-diamond carbon panicles are not bonded together will increase. As a result, the diamond after conversion will have a small particle size. On the contrary, if the particle size of the raw material is large, the diamond will have a large particle size, and hence, the value of the ratio B/A will increase. The particle size of the non-diamond carbon powder is therefore set to 0.5 μm or less, and the lower limit value thereof is set to 0.05 μm for reasons of production. More preferably, the particle size of the non-diamond carbon powder is not less than 0.1 μm and not more than 0.5 μm.

As used herein, the particle size of the non-diamond carbon powder refers to a mean particle size measured by the laser diffraction/scattering method using laser light.

The means for the preparation step is not limited as long as the non-diamond carbon powder is prepared. Examples of the means may include producing the non-diamond carbon powder using a conventionally known synthesis method, and obtaining commercially available non-diamond carbon powder.

Further, it is necessary for pressure P (GPa) and temperature T (° C.) in the sintering step to satisfy the following conditions: $P \geq 0.0000168T^2 - 0.0867T + 124$; $T \leq 2300$; and $P \leq 25$, because grain growth may occur at a higher temperature, and unconverted graphite may remain at a lower temperature, which causes the B/A ratio to exceed 0.080.

Temperature T (° C.) is not particularly limited as long as the polycrystalline diamond body is obtained, and it is not necessary to define the lower limit thereof. Temperature T (° C.) is more preferably 1700 to 2300° C.

Similarly, pressure P (GPa) is not particularly limited as long as the polycrystalline diamond body is obtained, and it is not necessary to define the lower limit thereof. Pressure P (GPa) is more preferably 13.5 to 25 GPa.

When a temperature and a pressure within the above-defined suitable ranges are used, and the sintering step that satisfies the above-defined relational expressions is performed, the ratio B/A of knoop indentation of the resulting polycrystalline diamond body is 0.080 or less, and preferably 0.051 to 0.077.

It is noted that the time during which the temperature and the pressure are applied in the sintering step is preferably 5 to 20 minutes. If the time is shorter than 5 minutes, sintering will be insufficient, and even if the time is over 20 minutes, the sintered condition will be the same, which is economically disadvantageous. The application time is more preferably 10 to 20 minutes.

This sintering step is a step of converting the non-diamond carbon powder into diamond particles and sintering the diamond particles. The non-diamond carbon powder alone is directly converted into diamond particles without using a sintering aid or a catalyst, and this conversion generally takes place simultaneously with sintering.

The polycrystalline diamond body obtained by the method as described above has a fine particle size of the diamond particles forming the polycrystalline diamond body, and exhibits an elastic behavior. This makes the polycrystalline body tough with improved chipping resistance. The polycrystalline diamond body, therefore, can be suitably used as a cutting tool, a wear-resistant tool, a grinding tool, and the like for use in applications such as high-speed micromachining with high load, for example.

EXAMPLES

Examples 1 to 6

Each of polycrystalline diamond bodies according to Examples 1 to 6 was prepared in the manner described below. As non-diamond carbon particles for use as a starting material, graphite powder having a particle size of 0.5 μm or less (denoted as the "Fine Graphite Powder" in the column of starting material shown in Table 1 below) was prepared first (preparation step).

Next, the graphite powder prepared above was placed in a capsule made of a high-melting-point metal having a melting point of 2600° C. or more, and maintained for 20 minutes at the pressure and the temperature shown in Table 1 (the column of "Synthesis Conditions"), using an ultra-high pressure and high temperature generating apparatus. The fine graphite powder was thereby converted into diamond particles and sintered (sintering step). A polycrystalline diamond body was thus obtained.

It is noted here that pressure P (GPa) and temperature T (° C.) in each of Examples 1 to 6 shown in Table 1 satisfy the conditions: $P \geq 0000168T^2 - 0.0867T + 124$; $T \leq 2300$; and $P \leq 25$.

Comparative Examples 1 to 3

Each of polycrystalline diamond bodies according to Comparative Examples 1 to 3 was prepared in the manner described below. As non-diamond carbon powder for use as a starting material, graphite powder having a particle size of 0.5 μm or less (denoted as the "Fine Graphite Powder" in the column of starting material shown in Table 1 below) was prepared first (preparation step).

Next, the graphite powder prepared above was placed in a capsule made of a high-melting-point metal having a melting point of 2600° C. or more, and maintained for 20 minutes at the pressure and the temperature shown in Table 1 (the column of "Synthesis Conditions"), using an ultra-high pressure and high temperature generating apparatus. The fine graphite powder was thereby converted into diamond particles and sintered (sintering step). A polycrystalline diamond body was thus obtained.

It is noted here that pressure P (GPa) and temperature T (° C.) in Comparative Example 1 do not satisfy the condition $T \leq 2300$. Moreover, pressure P (GPa) and temperature T (° C.) in each of Comparative Examples 2 and 3 do not satisfy the condition $P \geq 0.0000168T^2 - 0.0867T + 124$.

Comparative Example 4

A polycrystalline diamond body according to Comparative Example 4 was prepared in the manner described below. As non-diamond carbon powder for use as a starting material, graphite powder having a particle size of 5 μm or less (denoted as the "Coarse Graphite Powder" in the column of starting material shown in Table 1 below) was prepared first (preparation step).

Next, the graphite powder prepared above was placed in a capsule made of a high-melting-point metal having a melting point of 2600° C. or more, and maintained for 20 minutes at the temperature and the pressure shown in Table 1 (the column of "Synthesis Conditions"), using an ultra-high pressure and high temperature generating apparatus.

The coarse graphite powder was thereby converted into diamond and sintered (sintering step). A polycrystalline diamond body was thus obtained.

It is noted that since the coarse graphite particles having a particle size of 5 µm or less were used as the starting material, the above-described conditions do not satisfy the condition of being non-diamond carbon powder having a particle size of 0.5 µm or less.

Comparative Example 5

A sintered diamond body according to Comparative Example 5 was prepared in the manner described below. As a starting material, powder obtained by mixing diamond powder having a mean panicle size of 0.5 µm and a cobalt (Co)-based metal-based binder in a volume ratio of 85:15 (denoted as the "Diamond Powder/Metal-Based Binder Powder" in the column of starting material shown in Table 1 below) was prepared first (preparation step).

Next, the mixed powder prepared above was placed in a capsule made of a high-melting-point metal having a melting point of 2600° C. or more, and maintained for 20 minutes at the pressure and the temperature shown in Table 1 (the column of "Synthesis Conditions"), using an ultra-high pressure and high temperature generating apparatus. The mixed powder was thereby sintered (sintering step). A sintered diamond body was thus obtained. It is noted that the above-described conditions are different in terms of starting material from those in Examples 1 to 6 and Comparative Examples 1 to 4.

<Evaluation>

For each of the polycrystalline diamond bodies according to Examples 1 to 6 and Comparative Examples 1 to 4 and the sintered diamond body according to Comparative Example 5 obtained as described above, the composition, the X-ray diffraction, the particle size, and the B/A ratio of knoop indentation were measured using the methods as described below.

<Composition>

The diamond particles contained in each of the polycrystalline diamond bodies and the sintered diamond body were identified using an X-ray diffractometer. The X-ray source of the X-ray diffractometer was Cu Kα radiation at a wavelength of 1.54 angstroms.

<X-Ray Diffraction>

For the diamond particles contained in each of the polycrystalline diamond bodies and the sintered diamond body, the ratio of the X-ray diffraction intensity $I_{(220)}$ in the (220) plane with respect to the X-ray diffraction intensity $I_{(111)}$ in the (111) plane, expressed as a ratio $I_{(220)}/I_{(111)}$, was determined using an X-ray diffractometer. The X-ray source of the X-ray diffractometer was Cu Kα radiation at a wavelength of 1.54 angstroms. The results are shown in the column of "XRD $I_{(220)}/I_{(111)}$" in Table 1.

<Particle Size>

The mean particle size of the diamond particles contained in each of the polycrystalline diamond bodies and the sintered diamond body was determined by an intercept method using a scanning electron microscope.

Specifically, the polycrystalline diamond bodies and the sintered diamond body were observed with a scanning electron microscope (SEM) to obtain SEM images.

A circle was then drawn on each of the SEM images, and eight straight lines were drawn radially from the center of the circle to the perimeter of the circle (such that the intersection angle between adjacent straight lines was substantially equal). In this case, the observation magnification and the diameter of the circle described above were set such that the number of diamond particles per straight line was about 10 to 50.

Next, for each straight line, the number of times that the straight line crossed grain boundaries of the diamond particles was counted, an average intercept length was determined by dividing the length of the straight line by the number of times of crossing, and the average intercept length was multiplied by 1.128 to give the mean particle size.

It is noted that the SEM images were magnified by 30000 times. At a magnification below 30000 times, the number of particles within the circle will be large, which makes grain boundaries difficult to observe, and causes a counting error. Moreover, it is likely that the plate-like structure will be included when drawing lines. On the other hand, at a magnification over 30000 times, the number of particles within the circle will be too small, and an accurate mean particle size cannot calculated. In each of Comparative Examples 1 and 5, the magnification was set to 3000 times because the particle size was too large.

For each of the Examples and the Comparative Examples, three SEM images taken of different places for a single specimen were used. A mean particle size was determined for each of the SEM images by the above-described method, and a mean value of the three mean particle sizes obtained was determined as the mean particle size. The results are shown in the column "Mean Particle Size" in Table 1.

<Ratio B/a of Knoop Indentation>

In order to measure the ratio B/A of knoop indentation for each of the polycrystalline diamond bodies and the sintered diamond body, knoop hardness was measured under the conditions described below.

Specifically, a micro-knoop indenter was used as a knoop indenter, and knoop hardness was measured five times under a test load of 4.9 N at 23° C.±5° C. The ratio B/A of the length B of the shorter diagonal line with respect to the length A of the longer diagonal line of the diagonal lines of a knoop indentation was measured in each measurement using a laser microscope, and an average value of the measured values was determined as the ratio B/A of knoop indentation. The results are shown in the column of "Ratio B/A of Knoop Indentation" in Table 1.

TABLE 1

| | Starting Material | Synthesis Conditions | | Composition (vol %) | | XRD $I_{(220)}/I_{(111)}$ | Mean Particle Size of Diamond Particles (nm) | Ratio B/A of Knoop Indentation |
|---|---|---|---|---|---|---|---|---|
| | | Pressure (GPa) | Temperature (° C.) | Graphite | Diamond | | | |
| Ex. 1 | Fine Graphite Powder | 23 | 1800 | 0 | 100 | 0.23 | 18 | 0.051 |
| Ex. 2 | Fine Graphite Powder | 18 | 2000 | 0 | 100 | 0.12 | 21 | 0.063 |
| Ex. 3 | Fine Graphite Powder | 14 | 2300 | 0 | 100 | 0.28 | 36 | 0.077 |
| Ex. 4 | Fine Graphite Powder | 25 | 2300 | 0 | 100 | 0.21 | 41 | 0.076 |
| Ex. 5 | Fine Graphite Powder | 20 | 2100 | 0 | 100 | 0.23 | 30 | 0.068 |

TABLE 1-continued

| | Starting Material | Synthesis Conditions Pressure (GPa) | Temperature (° C.) | Composition (vol %) Graphite | Diamond | XRD $I_{(220)}/I_{(111)}$ | Mean Particle Size of Diamond Particles (nm) | Ratio B/A of Knoop Indentation |
|---|---|---|---|---|---|---|---|---|
| Ex. 6 | Fine Graphite Powder | 17 | 2200 | 0 | 100 | 0.18 | 33 | 0.071 |
| Comp. Ex. 1 | Fine Graphite Powder | 18 | 2600 | 0 | 100 | 0.08 | 230 | 0.099 |
| Comp. Ex. 2 | Fine Graphite Powder | 18 | 1600 | 15 | 85 | 0.20 | 17 | 0.105 |
| Comp. Ex. 3 | Fine Graphite Powder | 13 | 2000 | 12 | 88 | 0.16 | 24 | 0.095 |
| Comp. Ex. 4 | Coarse Graphite Powder | 16 | 2300 | 0 | 100 | 0.20 | 52 | 0.085 |
| Comp. Ex. 5 | Diamond Powder/ Metal-Based Binder Powder | 7 | 1800 | 0 | 100 (Excluding Binder) | — | 500 | 0.121 |

As shown in Table 1, the mean particle size of the diamond particles according to each of Examples 1 to 6 was 18 to 41 nm. In this case, the ratio B/A of knoop indentation in each of Examples 1 to 6 was 0.051 to 0.077.

On the other hand, the mean particle size of the diamond particles according to Comparative Example 1 was 230 nm, which was larger than that of each of Examples 1 to 6. Moreover, the ratio B/A of knoop indentation in Comparative Example 1 was 0.099, which reveals that the amount of elastic recovery was smaller, and thus, the elastic property was lower, than that in each of Example 1 to 6.

In each of Comparative Examples 2 and 3, in which one of the appropriate synthesis conditions, $P \geq 0.0000168T^2 - 0.0867T + 124$, was not satisfied, a large amount of unconverted graphite was contained in the polycrystalline body. Moreover, the ratio B/A of knoop indentation in each of Comparative Examples 2 and 3 was 0.105 and 0.095, respectively, which reveals that the amount of elastic recovery was smaller, and thus, the elastic property was lower, than that in each of Example 1 to 6.

In Comparative Example 4, the mean particle size of the diamond particles was 52 nm, which was larger than that in each of Examples 1 to 6. Moreover, the ratio B/A of knoop indentation in Comparative Example 4 was 0.085, which reveals that the amount of elastic recovery was smaller, and thus, the elastic property was lower, than that in each of Examples 1 to 6.

In Comparative Example 5, in which the diamond powder and the binder powder were used as starting materials, the mean particle size was 500 nm, which was larger than that in each of Examples 1 to 6. In this case, the ratio B/A of knoop indentation was 0.121, which reveals that the amount of elastic recovery was smaller, and thus, the elastic property was lower, than that in each of Example 1 to 6.

Further, each of the polycrystalline diamond bodies and the sintered diamond body according to the Examples and the Comparative Examples was attached to the tip of a ball end mill having a tip diameter of 0.5 mm, and the cutting performance was evaluated. Cemented carbide containing 12 mass % of cobalt (Co) was prepared as a workpiece, and cutting of 24 m was performed under the conditions of a rotation speed of 40000 rpm, a cutting speed of 120 mm/min, a cutting depth of 5 μm, and a feed rate of 5 μm. Table 2 shows amounts of wear of the tools after cutting was completed in terms of the relative ratio of the amount of wear in each of the Examples and the Comparative Examples with respect to the amount of wear in Example 1 (hereinafter, the relative ratio of tool wear).

TABLE 2

| | Relative Ratio of Tool Wear |
|---|---|
| Ex. 1 | 1 |
| Ex. 2 | 1.1 |
| Ex. 3 | 1.3 |
| Ex. 4 | 1.2 |
| Ex. 5 | 1.1 |
| Ex. 6 | 1 |
| Comp. Ex. 1 | Significant Chipping Occurred at the Cutting Edge, and Machining was Stopped. |
| Comp. Ex. 2 | Significant Chipping Occurred at the Cutting Edge, and Machining was Stopped. |
| Comp. Ex. 3 | Significant Chipping Occurred at the Cutting Edge, and Machining was Stopped. |
| Comp. Ex. 4 | 2.2 |
| Comp. Ex. 5 | 4.2 |

The relative ratio of tool wear in each of Examples 1 to 6 was 1 to 1.3. On the other hand, in each of Comparative Examples 1 to 3, significant chipping occurred at a cut length of 15 m, 5 m, or 6 m, respectively, where machining was stopped. The relative ratio of tool wear in each of Comparative Examples 4 and 5 was 2.2 or 4.2, respectively, which was significantly higher than that in each of Examples 1 to 6. The foregoing has confirmed that the polycrystalline diamond bodies according to the Examples are tougher than the polycrystalline diamond bodies and the sintered diamond body according to the Comparative Examples.

While the embodiments of the present invention have been described, it should be understood that the embodiments disclosed herein are illustrative and non-restrictive in every respect. It is intended that the scope of the present invention is defined by the terms of the claims rather than by the foregoing description, and includes all modifications within the scope and meaning equivalent to the claims.

What is claimed is:
1. A polycrystalline diamond body comprising:
diamond particles;
said diamond particles having a mean particle size of 50 nm or less,
said diamond particles having a ratio of an X-ray diffraction intensity $I_{(220)}$ in a (220) plane with respect to an X-ray diffraction intensity $I_{(111)}$ in a (111) plane accord- ing to X-ray diffraction, expressed as a ratio $I_{(220)}/I_{(111)}$, of not less than 0.1 and not more than 0.3, and as a result of measurement of a knoop hardness under a test load of 4.9 N at 23° C.±5° C., said polycrystalline diamond body having a ratio of a length B of a shorter diagonal line with respect to a length A of a longer diagonal line of diagonal lines of a knoop indentation, expressed as a B/A ratio, of 0.080 or less.

2. The polycrystalline diamond body according to claim 1, wherein said diamond particles have a mean particle size of 30 nm or less.

3. A cutting tool comprising the polycrystalline diamond body according to claim 1.

4. A wear-resistant tool comprising the polycrystalline diamond body according to claim 1.

5. A grinding tool comprising the polycrystalline diamond body according to claim 1.

6. A method for producing a polycrystalline diamond body according to claim 1, the method comprising the steps of:

preparing non-diamond carbon powder having a particle size of 0.5 μm or less as a starting material; and converting said non-diamond carbon powder into diamond particles and sintering said diamond particles at a temperature and a pressure satisfying the following conditions:

when P denotes pressure (GPa) and T denotes temperature (° C.), $P \geq 0.0000168T^2 - 0.0867T + 124$;

$T \leq 2300$; and $P \leq 25$.

* * * * *